(12) United States Patent
Geraets

(10) Patent No.: US 9,051,134 B2
(45) Date of Patent: Jun. 9, 2015

(54) APPARATUS FOR LOADING PARTICULATE MATTER INTO A TRANSPORT CONTAINER

(75) Inventor: Paul Geraets, Dell Rapids, SD (US)

(73) Assignee: Dakota Ethanol, L.L.C., Wentworth, SD (US)

( * ) Notice: Subject to any disclaimer, the term of this patent is extended or adjusted under 35 U.S.C. 154(b) by 140 days.

(21) Appl. No.: 13/004,065

(22) Filed: Jan. 11, 2011

(65) Prior Publication Data

US 2012/0177466 A1 Jul. 12, 2012

(51) Int. Cl.
*B65G 1/00* (2006.01)
*B65G 69/02* (2006.01)
*B65G 65/46* (2006.01)

(52) U.S. Cl.
CPC .............. *B65G 69/02* (2013.01); *B65G 65/466* (2013.01)

(58) Field of Classification Search
CPC ..................................................... B65G 65/466
USPC .................................. 414/288, 293, 300, 400
See application file for complete search history.

(56) References Cited

U.S. PATENT DOCUMENTS

| 262,184 | A | | 8/1882 | Johnson |
| 673,875 | A | | 5/1901 | Jordan |
| 3,791,592 | A | | 2/1974 | Cobb |
| 3,881,409 | A | * | 5/1975 | Frigieri ........................... 100/68 |
| 4,043,488 | A | * | 8/1977 | Halvorsen et al. ............. 222/233 |
| 4,738,774 | A | | 4/1988 | Patrick |
| 5,176,426 | A | * | 1/1993 | Adamson ..................... 299/39.3 |
| 5,393,189 | A | | 2/1995 | Berquist |
| 8,376,682 | B2 | * | 2/2013 | Anderson et al. ............. 414/311 |
| 2002/0076308 | A1 | | 6/2002 | Bailey et al. |
| 2003/0222411 | A1 | * | 12/2003 | Simon ........................... 277/630 |
| 2004/0046071 | A1 | | 3/2004 | Shivvers |
| 2004/0265098 | A1 | | 12/2004 | DePierri |
| 2010/0111654 | A1 | | 5/2010 | Schroeder et al. |
| 2010/0254790 | A1 | * | 10/2010 | Tkachyk ....................... 414/311 |

* cited by examiner

*Primary Examiner* — Saul Rodriguez
*Assistant Examiner* — Willie Berry, Jr.
(74) *Attorney, Agent, or Firm* — Zarley Law Firm, P.L.C.

(57) ABSTRACT

A device for loading particulate matter into a transport container having a blade assembly slidably mounted to a frame. Preferably the blade assembly includes a pair of cylinders mounted in parallel spaced relation to the frame, a pair of brackets slidably mounted to the cylinders, and a blade rotatably mounted to the brackets at each end.

6 Claims, 4 Drawing Sheets

APPARATUS FOR LOADING PARTICULATE MATTER INTO A TRANSPORT CONTAINER

BACKGROUND OF THE INVENTION

This invention is directed toward a device for loading a transport container. More particularly, the invention is directed toward a device that more completely fills a transport container.

Loading particulate matter, such as dried distiller grains (DDG), is well known in the art. Typically, grain is released from a load out spout line and through gravity falls through an opening in the transport container. As the opening is normally centrally located, grain accumulates within the center and does not completely fill the container leaving gaps and spaces usually in the upper corners of the container. At this point, sometimes grain is shoveled into the corners and, while this helps, the process is time consuming, labor intensive, and still does not fill the container to capacity. Thus, there is a need in the art for a device that addresses these deficiencies.

An objective of the present invention is to provide a device that more efficiently loads particulate matter into a transport container.

A still further objective of the present invention is to provide a device that more easily loads particulate matter into a transport container.

These and other objectives will be apparent to one of ordinary skill in the art based upon the following written description, drawings, and claims.

SUMMARY OF THE INVENTION

A device for loading particulate matter into a transport container having a blade assembly slidably mounted to a frame. Preferably the blade assembly includes a pair of cylinders mounted in parallel spaced relation to the frame, a pair of brackets slidably mounted to the cylinders, and a blade rotatably mounted to the brackets at each end.

DETAILED DESCRIPTION OF THE PREFERRED EMBODIMENTS

Figure 1:
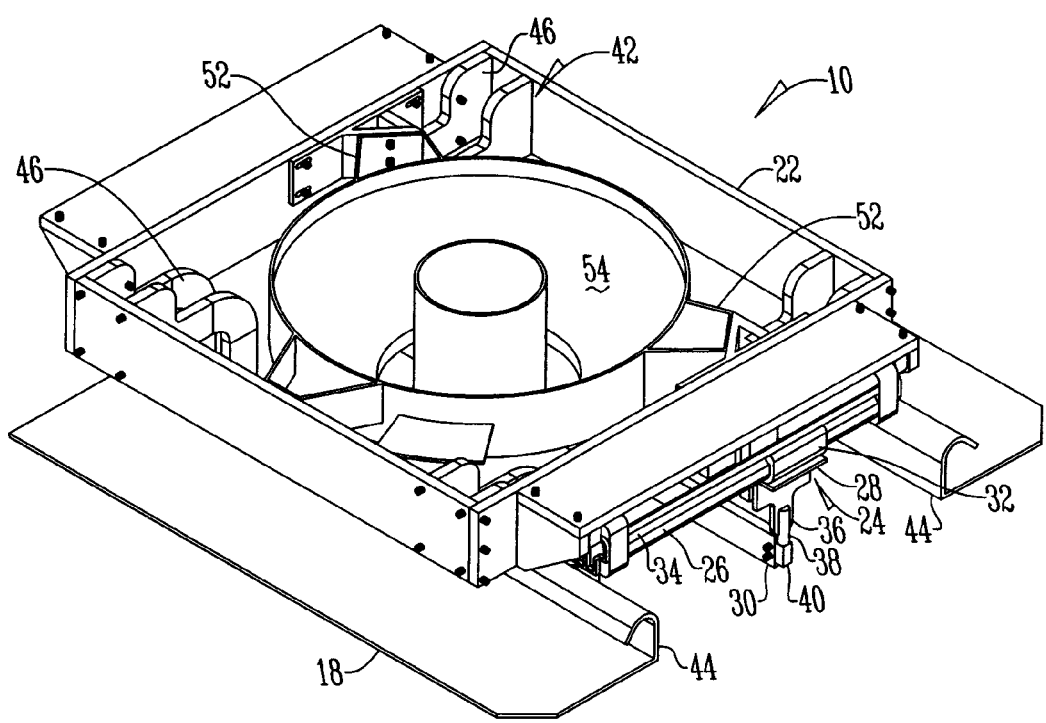
FIG. 1 is a perspective view of the top of a loading device with a spout.
Figure 2:
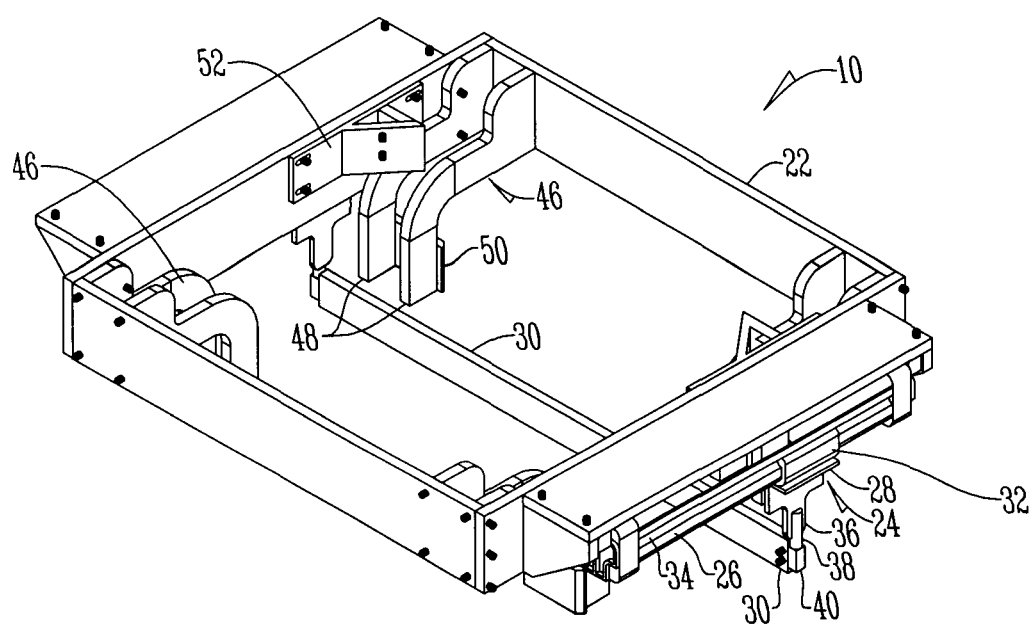
FIG. 2 is a perspective view of the top of a loading device without a spout.
Figure 3:
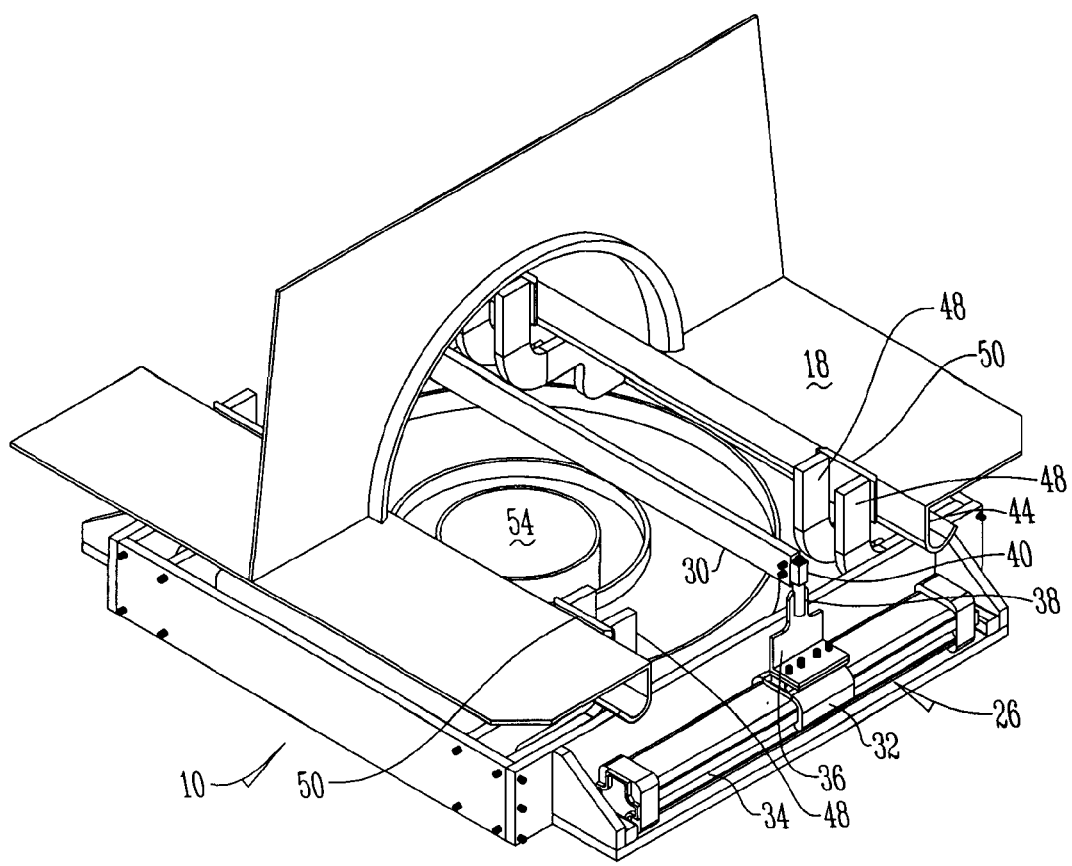
FIG. 3 is a perspective view of the bottom of a loading device with a spout.
Figure 4:
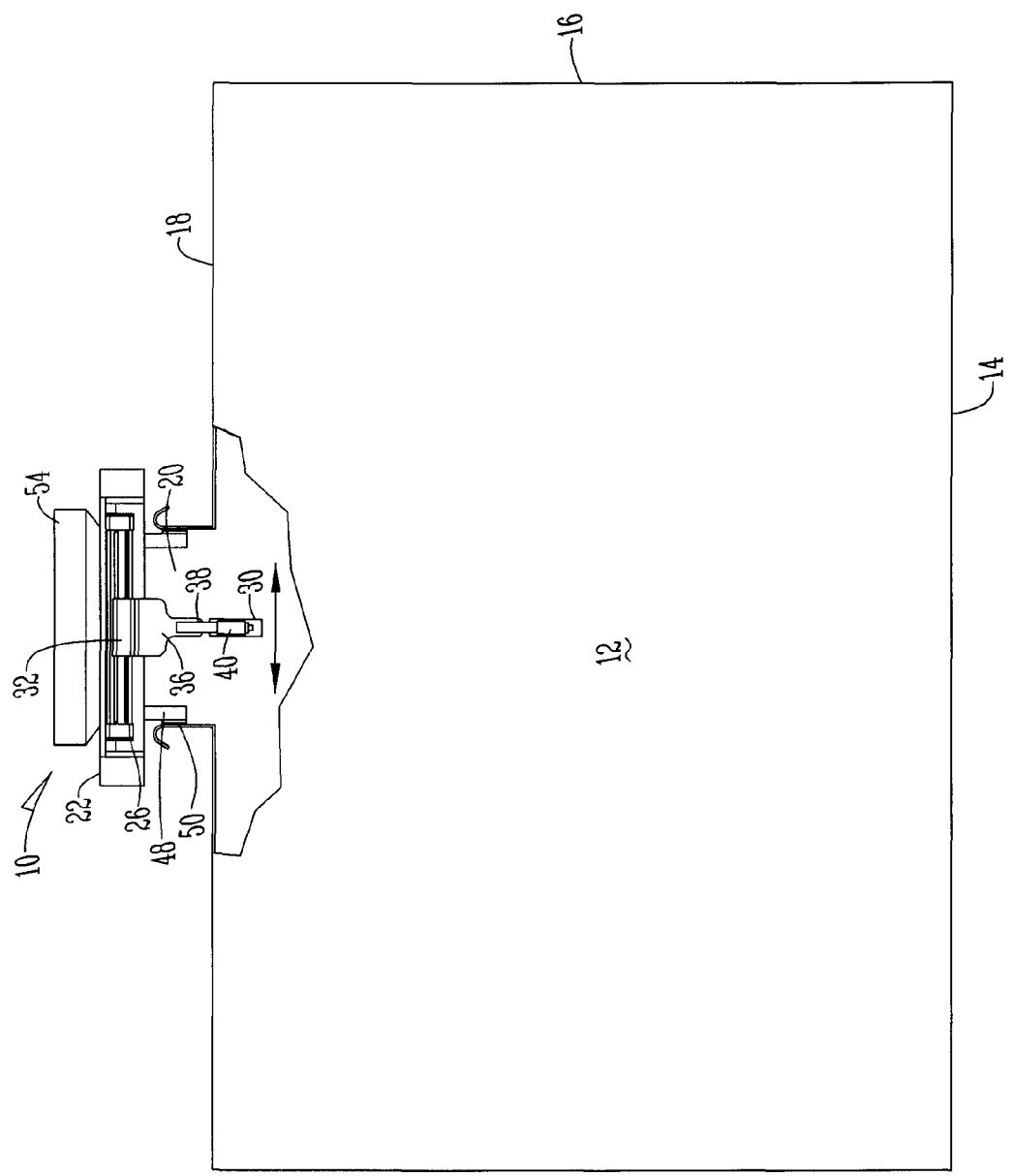
FIG. 4 is a sectional view of a loading device and a container.

Referring to the Figures, the loading device 10 is used to fill a transport container 12 with particulate matter. The transport container 12 is of any size and shape and includes rail cars, truck containers, containers hauled on a barge or a ship, and the like. The container 12 has a bottom 14, sidewalls 16, a top wall 18 wherein the top wall 18 has an elongated opening 20.

The loading device 10 has a frame 22 with a blade assembly 24 connected to the frame 22. Preferably, the blade assembly 24 has a pair of cylinders 26 that are attached to the frame 22 in parallel spaced relation. The cylinders are of any type. Slidably attached to each cylinder 26 is a bracket 28. Connected to and extending between the brackets 28 is a blade 30. In one embodiment the bracket includes a U-shaped member 32 that slidably fits within an elongated groove 34 on the cylinder 26. A generally L-shaped member 36 is connected to the bottom of the U-shaped member 34. Connected to the L-shaped member 36 is a shaft 38 wherein the opposite end is received within a block 40 that is attached to blade 30. The block 40 has a bearing (not shown) disposed within the block 40 and receives the shaft 38 such that the block 40 is able to rotate about shaft 38.

Mounted to the frame 22 are a plurality of braces 42 that are positioned to fit within opening 20 of the container 12 and against the edge 44 of the opening 20. The brace 42 is of any size, shape, or type and preferably has an L-shaped support member 46 that extends inwardly and downwardly from frame 22. Mounted on the downward or vertical section 48 of support member 46 is a brace plate 50 that engages edge 44 of opening 20 of container 12.

Also, mounted to the interior of the frame 22 are a plurality of connectors 52. The connectors 52 extend inwardly from the frame 22 and are connected to the spout 54 of a load out spout line (not shown).

In operation the spout 54 is connected to the connectors 52 of frame 22. The loading device 10 is then positioned above opening 20 of container 12 and lowered such that the braces 42 engage the edges 44 of opening 20 of container 12. Once positioned, particulate matter is discharged from the load out spout line into container 12 as the blade assembly 24 is activated.

When activated the blade 30 oscillates back and forth from one side of the frame 22 to the other as the brackets 28 slide back and forth along cylinders 26. As grain falls toward the center of the container 12, the blade 30 engages the grain and pushes the grain toward each sidewall 16 of the container. If the blade 30 encounters a different load at each end the blade 30 is able to rotate in relation to the brackets 28 due to the bearings disposed within blocks 40. As the container 12 is filled and grain reaches the opening 20, the blade 30 is able to push grain into the upper corners of the container 12 which typically is an area that cannot be filled. As a result, the blade assembly permits a higher capacity of the grain to be loaded and the loading device disclosed, at the very least, meets the stated objectives.

What is claimed is:

1. A system for loading particulate matter into a transport container having an elongated opening, comprising:
   a loading device having a frame; and
   the frame having an opening through which grain is passed;
   a blade assembly having a pair of cylinders and a pair of brackets connected to the frame wherein a blade extends across the opening in the frame and is rotatably connected to the pair of brackets that ride on the pair of cylinders attached to the frame in parallel spaced relation;
   wherein when the loading device is positioned adjacent to the elongated opening of the transport container and activated the blade oscillates back and forth from one side of the frame to the other;
   wherein when grain is passed through the frame, the blade pushes the grain toward opposing sidewalls of the transport container thereby filling the transport container.

2. The system of claim 1 wherein each of the pairs of rails are positioned on opposite sides of frame.

3. The system of claim 1 wherein a spout of a load out spout line is connected to the frame.

4. The device of claim 1 wherein the blade assembly is positioned below the opening of the frame.

5. A device for loading particulate matter into a transport container having an elongated opening and opposing walls, comprising:

a loading device having a frame having a front-side, a back-side and opposing lateral-sides;
the frame having an opening through which grain is passed;
a first-rail connected adjacent the front-side of the frame and a second rail connected adjacent the back side of the frame;
a blade assembly connected to the first-rail on a first end and the second-rail on a second end;
the blade assembly having a rotatable blade which extends across the opening in the frame;
wherein when the loading device is positioned adjacent the elongated opening of the transport container and activated the blade slides from opposing lateral side to opposing lateral side;
wherein when grain is passed through the frame, the blade pushes the grain toward opposing walls of the transport container thereby filling the transport container.

6. The device of claim 5 further comprising at least one cylinder connected to the blade, such that when activated the at least one cylinder moves the blade across the opening of the transport container.

\* \* \* \* \*